June 27, 1944. J. V. HORR 2,352,436
COLLAPSIBLE CARDBOARD DISPLAY DEVICE
Filed Dec. 31, 1941 6 Sheets-Sheet 1

INVENTOR.
JOHN V. HORR.
BY Gluck & Breitenfeld
ATTORNEYS.

June 27, 1944.  J. V. HORR  2,352,436

COLLAPSIBLE CARDBOARD DISPLAY DEVICE

Filed Dec. 31, 1941  6 Sheets-Sheet 2

INVENTOR.
JOHN V. HORR.
BY
ATTORNEYS

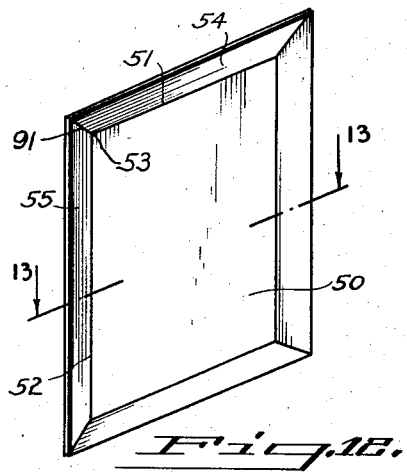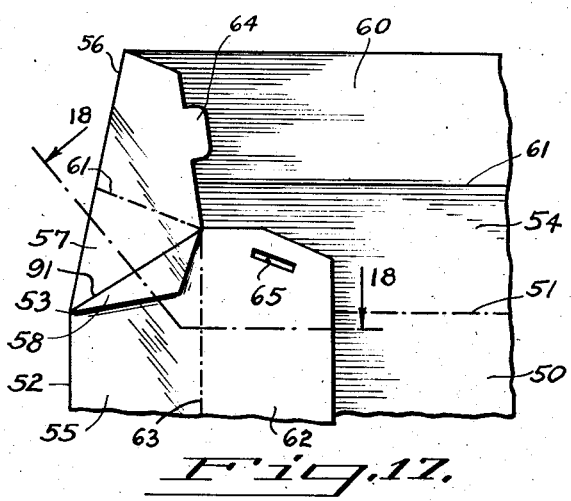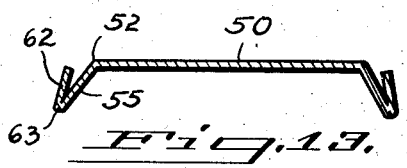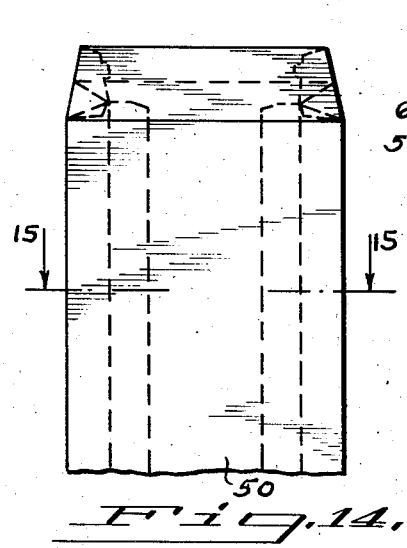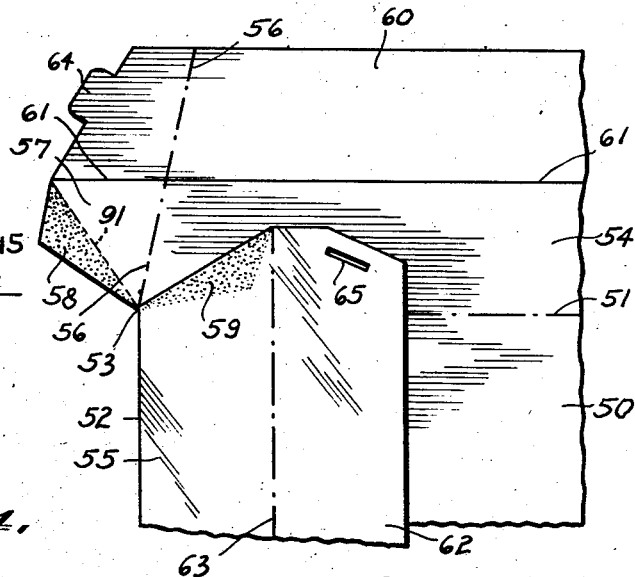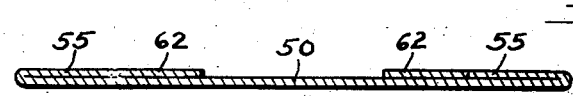

June 27, 1944. J. V. HORR 2,352,436
COLLAPSIBLE CARDBOARD DISPLAY DEVICE
Filed Dec. 31, 1941 6 Sheets-Sheet 4

INVENTOR.
JOHN V. HORR.
BY
ATTORNEYS.

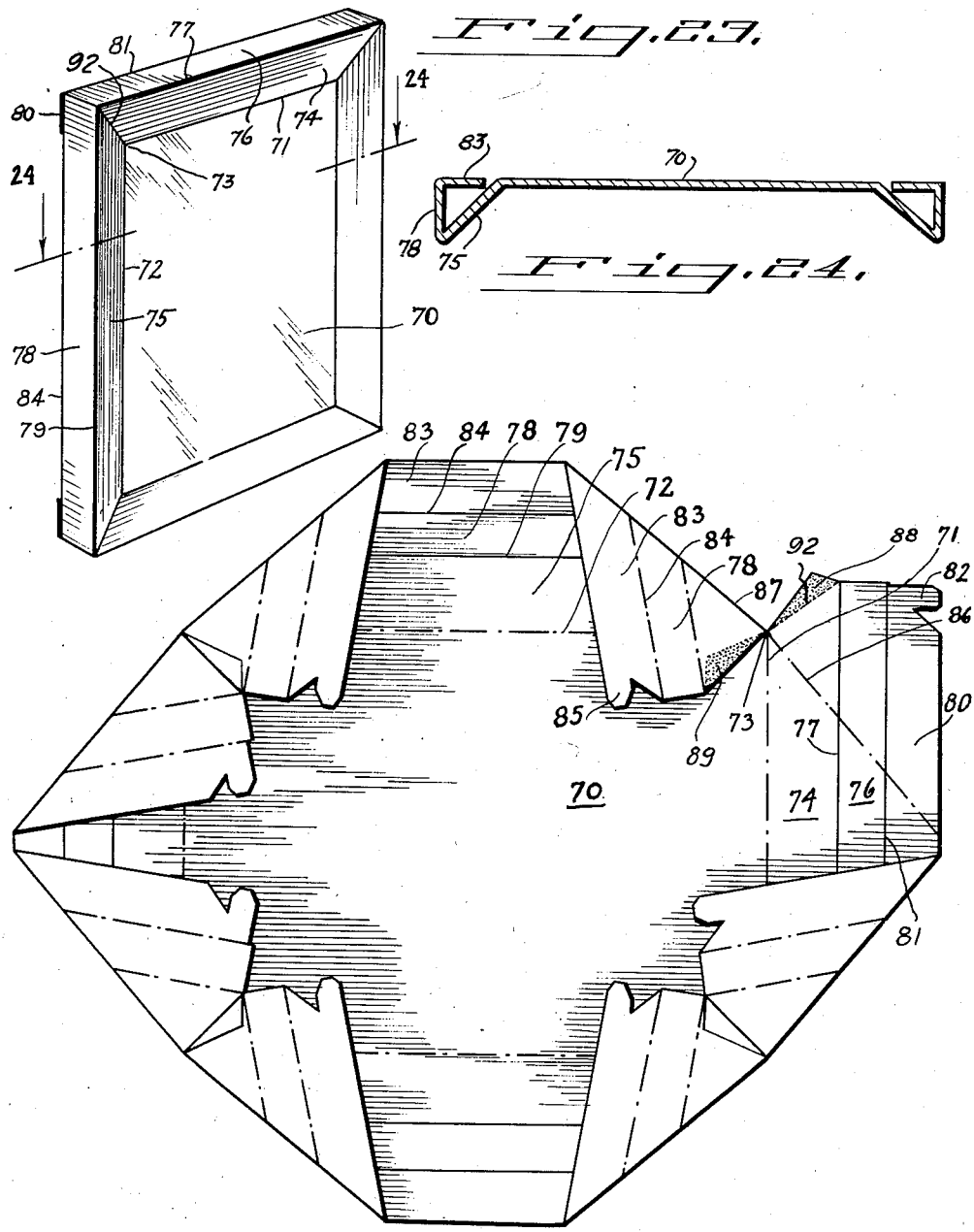

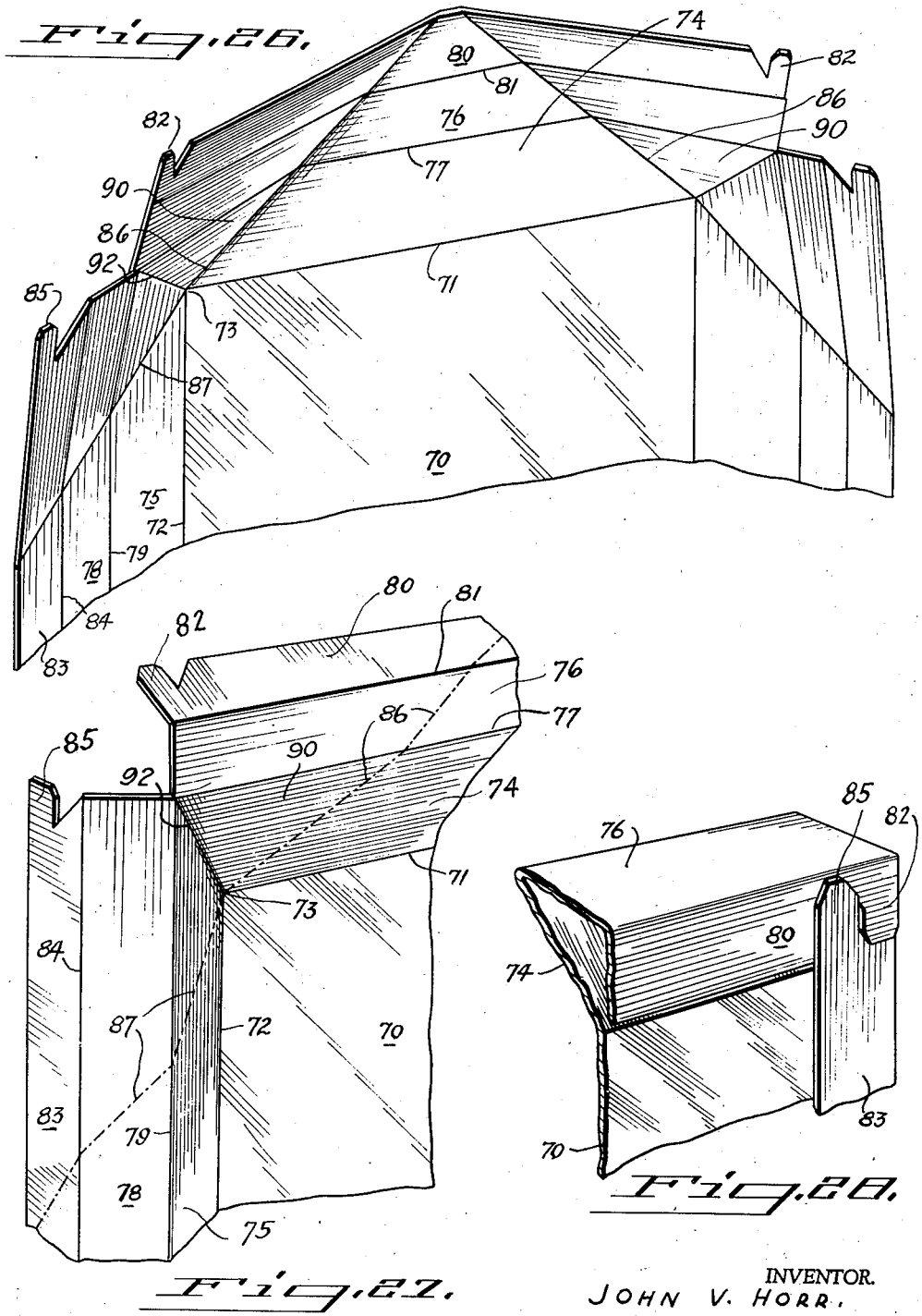

Patented June 27, 1944

2,352,436

UNITED STATES PATENT OFFICE 2,352,436

COLLAPSIBLE CARDBOARD DISPLAY DEVICE

John V. Horr, Hastings on Hudson, N. Y., assignor to Einson-Freeman Co., Inc., Long Island City, N. Y., a corporation of Delaware Application December 31, 1941, Serial No. 425,046

7 Claims. (Cl. 40—154)

My present invention relates generally to display devices, and has particular reference to a cardboard display device of the type which is primarily adapted to be used in store windows and on counters.

A general object of the invention is to provide an improved display device, which is adapted to be inexpensively manufactured from flat cardboard stock or its equivalent, and which is of such a character that it may be shipped and stored in a substantially flat condition, and may be readily adjusted into set-up condition when it is to be used.

A more specific object of my invention is to provide certain improvements in a display device of the character in which there is a main display area surrounded by an inclined border portion. The border may be inclined rearwardly in substantially the manner illustrated and described in U. S. Patent No. 2,055,201, in which case a pleasing three-dimensional effect is produced; or the border may be inclined forwardly to produce a more conventional framelike effect. In either case, the device consists essentially of a main display area and panels hinged to the edges of said area and conjointly adapted to define a border for the device.

The invention relates more specifically to the type of device in which the main display area is at least partially polygonal in shape, i. e., it includes at least one corner where two adjacent edges converge at an angle. Most commonly, the display area is rectangular, thus including four such corners. So far as the applicability of the invention is concerned, however, it makes no difference how many corners there are.

The provision of an inclined border for such a display area presents no special difficulty where the device is not of collapsible type, so that the border panels may be permanently interconnected. However, in providing for collapsibility of the device into a substantially flat state, a special problem arises with respect to the design of the border panels because of the necessity to provide proper continuity of the border at the corner portions of the device when it is set up. A relatively simple way to solve this problem is exemplified in the aforementioned patent, No. 2,055,201, in which the border panels on adjacent edges of the display area are separable when the device is to be collapsed, the end edges of the panels being brought into abutment when the device is set up. This arrangement is not entirely satisfactory, however, because an accurate abutment is not always achieved.

A specific object of the present invention is to provide an improved structure wherein the border panels are permanently joined in proper and accurate relationship, and are nevertheless of collapsible character. Thus the invention achieves in a collapsible structure an advantage heretofore present only in a non-collapsible one.

I achieve the foregoing objects and advantages, and such other objects and advantages as may hereinafter be pointed out, in the manner illustratively exemplified in the accompanying drawings in which:

Figure 12 is a perspective view similar to Figure 1 illustrating a modified type of display device in which the inclined border portion flares forwardly;

Figure 13–22 are views corresponding, respectively to Figures 2–11 and depicting the nature of the modified device of Figure 12;

Figure 23 is a perspective view similar to Figures 1 and 12 illustrating a further modification;

Figure 24 is a cross-sectional view taken substantially along the line 24—24 of Figure 23;

Figure 25 is a plan view of the device in collapsed condition, illustrating also the steps involved in manufacture; and Figures 26–28 are fragmentary perspective views illustrating successive stages in the process of setting up the device of Figure 23.

Figure 1:
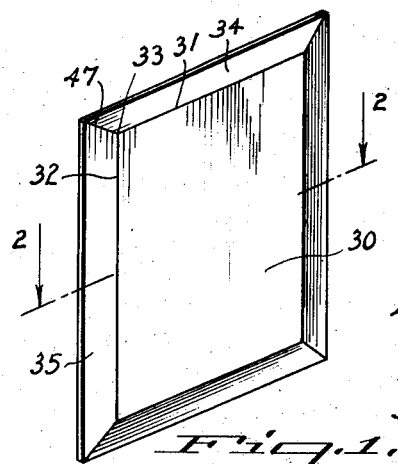
Figure 1 is a perspective view of an illustrative display device constructed in accordance with the present invention.

Before describing these figures, it should be pointed out that in scoring cardboard sheet material, it is a well-known procedure to make a cut in the cardboard extending partway through the thickness of the carboard, the cut being made on one or the other surface depending upon the direction in which the contemplated folding of the cardboard is to take place. For example, if the parts on opposite sides of a score line are to fold forwardly, the cut is made on the rear surface, and if the parts are to fold rearwardly, the cut is made on the front surface. Accordingly, in all the figures of the present drawings the score lines are indicated either by a full line or a dot-and-dash line. Where the scoring cut is on the front face (as the figure is viewed by the observer) it is shown by a full line; and where the scoring cut is on the under surface (as the figure is viewed by the observer) it is indicated by a dot-and-dash line.

Referring now to Figure 1–11, I have chosen to illustrate a display device in which the main display area 30 is substantially rectangular. This area includes the two edges 31 and 32 which converge at an angle to form a corner whose apex is at 33. An explanation of the invention as it relates to this illustrative corner is deemed sufficient, since the other corners may be correspondingly constructed.

The device is preferably composed of a single blank of cardboard or equivalent material which is suitably cut and scored to define the various areas and panels. However, whether the device is formed of a single blank or not, a border panel 34 is hinged to the edge 31 and a complementary border panel 35 is hinged to the edge 32.

Figure 5:
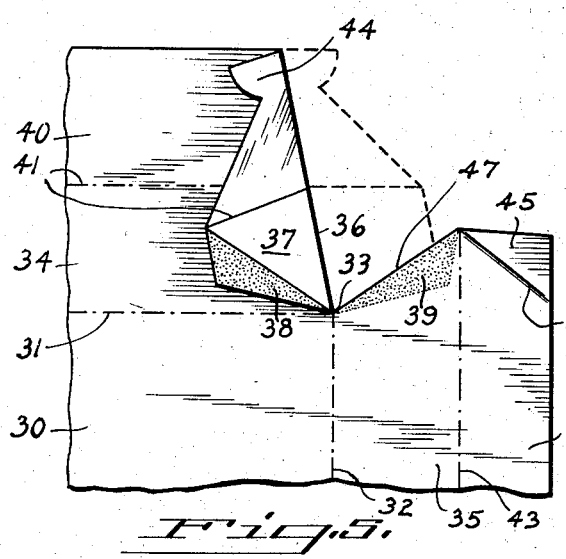
Figure 5 is a fragmentary plan view of one corner of the blank from which the device is made, showing a first step in the process of construction, this view being taken from the rear face of the blank.
Figure 6:
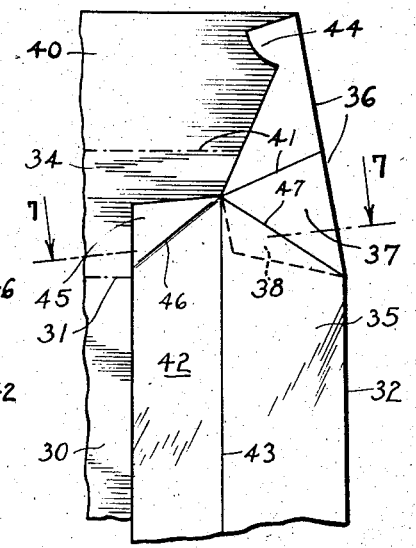
Figure 6 is a view similar to Figure 5 showing a succeeding step.
Figure 7:
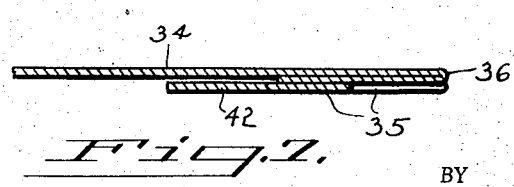
Figure 7 is a cross-sectional view taken substantially along the line 7—7 of Figure 6.

Extending transversely across the end portion of the panel 34 is the score line 36 which passes through the apex 33. The material on one side of this score line is adapted to be folded flat onto the material on the other side of the score line, as shown in Figures 5 and 6. In Figure 5, the material of the panel 34 that is folded over consists of the triangular end portion 37 and the triangular connecting tab 38. The dotted lines in Figure 5 indicate the position of the parts before this folding along the line 36 is performed.

The parts are so proportioned that when the border panel 35 is folded over along the hinge line 32, as shown in Figure 6, the triangular end portion 39 of the panel 35 will overlap the connecting portion 38 of the panel 34. In accordance with my invention, these overlapping portions are permanently secured together, preferably by adhesive. This pasting process may be easily carried out during the manufacture of the device with the parts in the flat overlapping relationship shown in Figure 6.

It will be observed that the score line 36 is out of alignment with the hinge line 32. This fact, coupled with the fact that the portions 38 and 39 are permanently joined, results in swinging the panels 34 and 35 into an inclined relationship with respect to the display area 30 when the device is set up. The angularity of the score line 36 is so chosen as to produce a predetermined inclination of the border panels 34 and 35. Stated otherwise, the permanent connection between the adjacent ends of the panels 34 and 35 is along a hinge line 47 defining a miter joint between them. This miter joint is inclined to the plane of the main display area 30 when the device is set up whereby the panels 34 and 35 form an inclined frame-like border.

Figure 9:
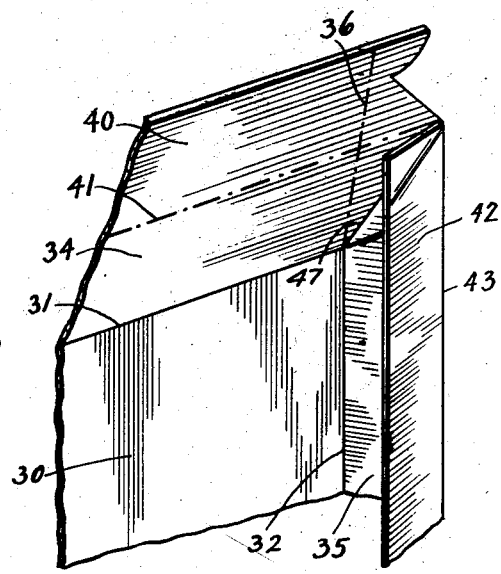
Figure 10:
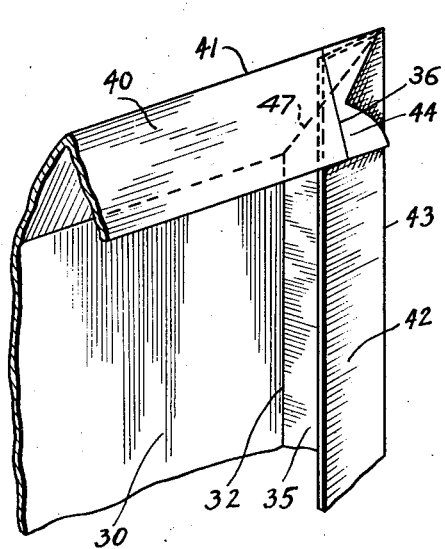
Figure 11:
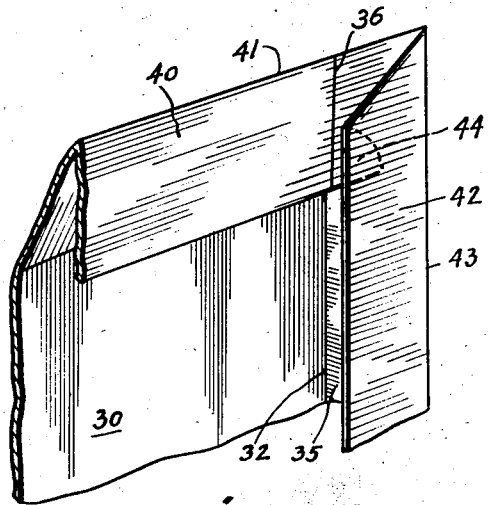
Figures 19, 20:
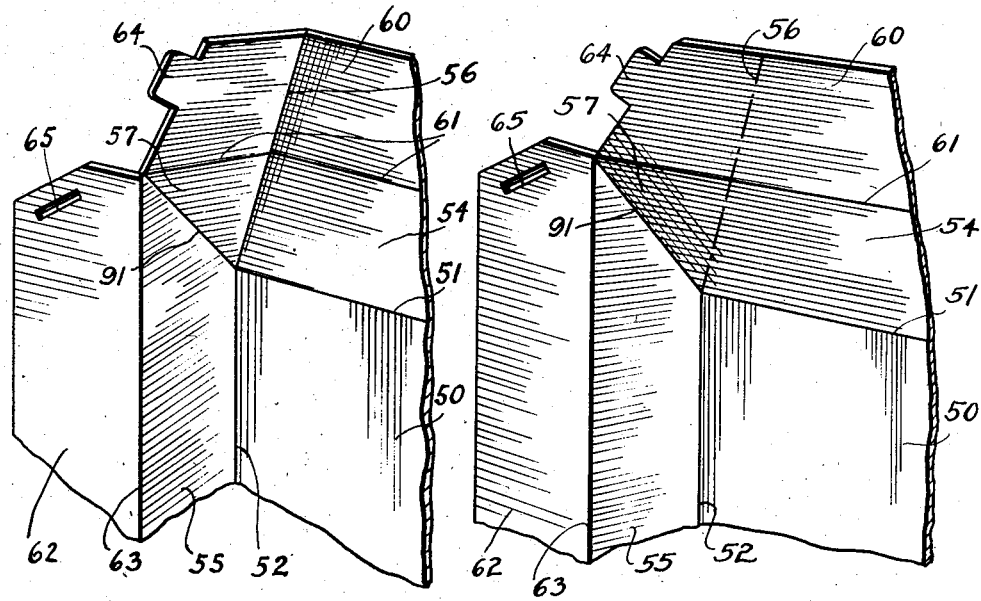

In order to retain the panel portions 34 and 37 in a single plane when the device is in set up condition, I find it advantageous to provide a stiffening flap 40. This flap is hinged to the outer edge 41 of the border panel 34, and it is to be observed that the score line 36 is continued across the flap 40, thus intersecting the hinge line 41. When the device is collapsed, the hinge 41 between the panel 34 and the stiffening flap 40 straightens out as shown in Figure 3, and when the device is set up the parts of the flap 40 on opposite sides of the score line 36 are straightened into a single plane as shown in Figures 9, 10 and 11.

A corresponding flap 42 is hinged along the line 43 to the outer edge of the border panel 35. Both of the flaps 40 and 42 are adapted to fold rearwardly when the device is set up, and it is preferable to provide a means for releasably retaining these flaps in this rearwardly-folded disposition. In the embodiment illustrated, this releasable retaining means has been shown in the form of a tab 44 formed at the end of the flap 40 and so arranged that it may be releasably hooked beneath the end portion 45 of the flap 42 when the device is set up. To facilitate this action, the flap 42 is preferably provided with a mild scoring 46.

Figure 3:
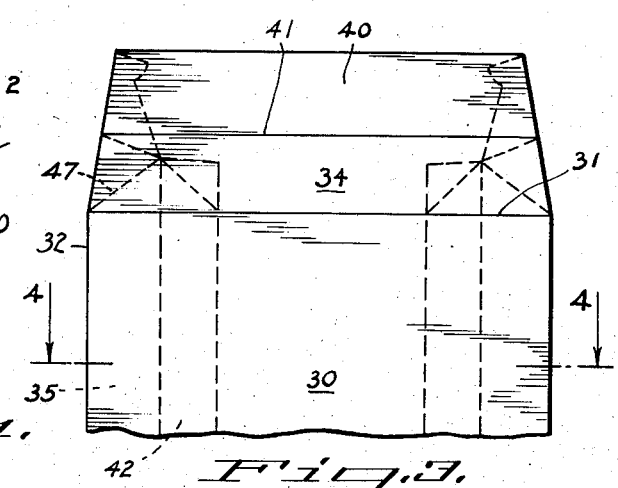
Figure 3 is a fragmentary plan view of the front of the device when collapsed.
Figure 2:
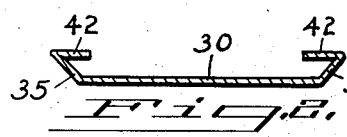
Figure 2 is a cross-sectional view taken substantially along the line 2—2 of Figure 1.
Figure 4:
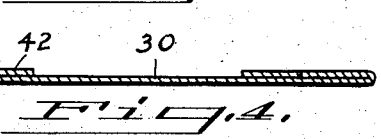
Figure 4 is a cross-sectional view taken substantially along the line 4—4 of Figure 3.

The various parts illustrated in Figures 5 and 6 are shown in the left-hand portion of Figure 3. The right-hand portion of Figure 3 may be correspondingly constructed.

When the device is in collapsed condition, the parts assume the relationship shown in Figures 3 and 6. The material on one side of the score line 36 is folded over onto the material on the other side. At the same time, the miter joint 47 straightens itself into a single plane parallel to the plane of the main display area 30. Similarly, the material on one side of the fold or hinge line 32 folds flatwise over the material on the other side of this line. The device is thus in a substantially flat condition, in which condition it is admirably suited for storage or shipment.

Figure 8:
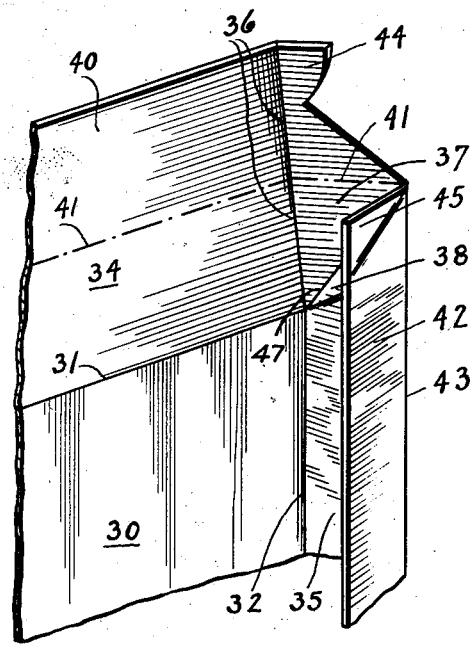
Figures 8–11 are fragmentary perspective views of the corner shown in Figures 5 and 6 showing successive steps in adjusting the device into set up condition.

When the device is to be set up, the parts are unfolded as shown in Figures 8 and 9. During the initial stages of this unfolding procedure, the two portions of the score line 36 remain in alignment until the panel portions 34 and 37 have assumed positions in a single plane. When this result has been achieved, as shown in Figure 9, the border panels 34 and 35 are in predetermined inclined relationship to the main display area 30, the oblique hinge line or miter joint 47 between them being inclined to the plane of the main display area 30. It then remains merely to swing the flaps 40 and 42 rearwardly and to bring about an interengagement of these flaps. This procedure is illustrated in Figures 10 and 11. When the parts are in the relationship of Figure 11 the device is in set up condition as shown in Figure 1.

A collapsing of the structure is accomplished by a reverse procedure. The tab 44 is first disengaged from beneath the end portion 45 of the flap 42. The stiffening flap 40 is then swung outwardly until the two portions of the score line 36 are again in alignment. The parts may then be folded along this score line to restore them to the relationship shown in Figures 3 and 6.

In the embodiment illustrated in the foregoing figures, the border portion of the device extends obliquely rearwards, thus imparting a beveled three-dimensional effect to the structure. In Figures 12–22 I have shown the manner in which my invention is equally applicable to a device in which the border portion flares obliquely forwards with respect to the main display area, thus producing a pleasing frame-like effect.

In this embodiment of the invention, I have again chosen to illustrate a main display area of rectangular shape. The area 50 includes the edges 51 and 52 converging to the corner 53.

Figures 16 and 17 correspond to Figures 5 and 6, except that the blank of Figures 5 and 6 is shown from the rear side, while the blank of Figures 16 and 17 is shown from the front.

Referring to Figures 16 and 17, it will be observed that a border panel 54 is hinged to the edge 51, while a complementary border panel 55 is hinged to the edge 52. A score line 56 extends transversely across an end portion of the panel 54 and passes through the apex 53. A stiffening flap 60 is hinged to the outer edge of the panel 54 along the hinge line 61, and it is to be noted that the score line 56 extends transversely across the flap 60 in intersecting relationship to the line 61. A corresponding flap 62 is hinged along the line 63 to the outer edge of the border panel 55.

When the device is manufactured, the parts are folded down along the lines 52 and 56 and the connecting portion 58 of the panel 54 is permanently secured in overlapping relationship, preferably by adhesive means, to the end portion 59 of the panel 55. The parts are then in the relationship shown in Figure 17, the panels 54 and 55 being permanently connected along a hinge line 91 defining a miter joint between them, this joint being inclined to the plane of the main display area 50 when the device is set up.

By virtue of the fact that the score line 56 is not aligned with the fold line 52, an unfolding action brings the border panels into an inclined relationship to the main display area 50.

As in the preceding embodiment, the stiffening flaps 60 and 62 are adapted to be folded rearwardly when the device is set up, and a means is provided for releasably interengaging them. I have illustrated the possibility of using a tab or tongue 64 on the flap 60, and a slit 65 in the flap 62 adapted to receive the tongue 64.

Figures 21, 22:
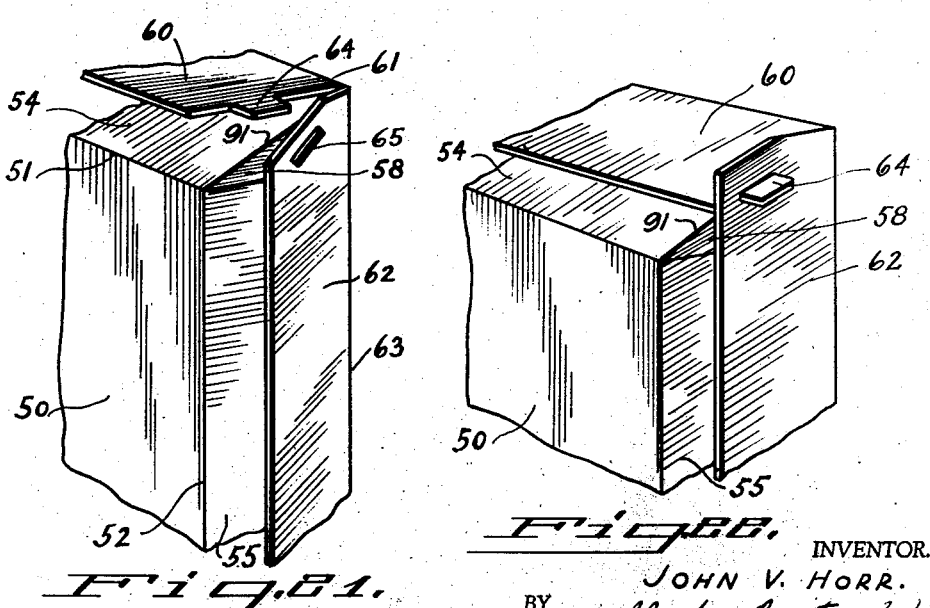

When the device is to be set up, the parts assume the successive relationships shown in Figures 19–22. The parts are first swung through the position of Figure 19 into the relationship shown in Figure 20 in which the two portions of the hinge line 61 are in alignment, thus bringing the panel portions 54 and 57 into a single plane. The flaps 60 and 62 are then swung rearwardly and interengaged as shown in Figures 21 and 22. This locks the parts in the desired angular relationships.

A collapsing of this structure is accomplished by a reversal of these steps, ultimately bringing the parts into the collapsed substantially flat relationship shown in Figure 14.

In Figure 23 I have shown a further modification in which the device, when set up, includes not only a main display area 70 and a forwardly inclined border, but also a rearwardly disposed margin, the various elements thus conjointly providing an attractive device of rugged and substantial character. Notwithstanding the sturdy and solid appearance of the finished structure shown in Figure 23, this device (as well as those previously described) may actually be composed of relatively light-weight cardboard stock.

As in the previous embodiments, the device of Figure 23 is preferably composed of a single blank of sheet material. The entire blank is shown in Figure 25, but a detailed description of only one corner portion will be given since the other corners may be correspondingly constructed.

The main display area 70 includes the adjacent edges 71 and 72 converging to define the corner 73. A border panel 74 is hinged to the edge 71 and a complementary border panel 75 is hinged to the edge 72. A stiffening flap 76 is hinged to the panel 74 along the line 77, and a corresponding stiffening flap 78 is hinged to the panel 75 along the line 79.

In this embodiment, an additional panel 80 is hinged to the flap 76 along the line 81, for attachment purposes, the panel 80 having an attachment tab 82 at its end. A corresponding attachment panel 83 is hinged along the line 84 to the stiffening flap 78, and is provided with an attachment tab 85.

A score line 86 extends transversely across the border panel 74, and passes through the apex 73 of the corner. The score line 86 is also continued across the stiffening flap 76 and the attachment panel 80, thus intersecting the hinge lines 77 and 81.

This embodiment differs from the previously described structures in that a corresponding score line 87 is also provided in the border panel 75, extending transversely across the latter and continuing across the stiffening flap 78 and the attachment panel 83.

The score lines 86 and 87 are not in alignment, and when the parts are folded down along these score lines the end portion 88 of the border panel 74 is brought into overlapping relation to the end portion 89 of the panel 75. These overlapping portions are then permanently joined, preferably by adhesive means, and this establishes a permanent connection between the panels 74 and 75 along a hinge line 92 defining a miter joint.

When the device is to be set up, the various parts are unfolded to assume successively the relationships shown in Figures 26–28. During the initial stages of the unfolding the triangular end portion 90 of the border panel 74 is at an angle to the main portion of the panel 74, but eventually the portions 74 and 90 assume positions in a single plane, as indicated in Figure 27. Thereupon the stiffening flap 76 is swung rearwardly, and the attachment panel 80 is also folded back. The same adjustments take place in the parts associated with the border panel 75. Ultimately, the tabs 82 and 85 are interlocked, and the parts are thus held in set up condition.

In each of the embodiments illustrated herein, it will be observed that the border panels are in permanent interengagement, as a result of which there is always an accurate continuity of the border at each corner region of the device. This is an advantage which is achieved without sacrificing the inherent collapsibility of the structure.

It is further to be noted that where adhesive is used to effect the interconnection of the border panels, the gluing procedure may be accomplished when the device is in substantially flat condition. This permits the employment of an ordinary press, and requires none of the special forms or blocks that would be necessary if the inclined border had to be formed and glued in a permanently set up relationship of the parts.

Because of the fact that the present structure may be composed of a single blank of material, and involves an extremely simple gluing operation or its equivalent, the resultant structure may be manufactured at relatively low cost. This is an additional advantage which my invention achieves.

In general, it will be understood that those skilled in the art may make changes in the details herein described and illustrated without departing from the spirit and scope of the invention as expressed in the appended claims. It is, therefore, intended that these details be interpreted as illustrative, and not in a limiting sense.

Having thus described my invention and illustrated its use, what I claim as new and desire to secure by Letters Patent is:

1. In a collapsible cardboard display device, a main display area including a corner where two adjacent edges converge at an angle, a border panel hinged to each of said edges, the adjacent ends of said panels being permanently connected along a hinge line defining a miter joint between said panels, said joint being inclined to the plane of said main display area when the device is set up whereby the panels form an inclined frame-like border, and a score line extending transversely across an end portion of at least one of said panels, said score line passing through the apex of said corner angle and being so arranged that the device may be collapsed by folding the material on one side of said score line flat onto the material on the other side of it, thereby straightening the miter joint into a single plane parallel to the plane of said main display area.

2. In a collapsible cardboard display device, a main display area including a corner where two adjacent edges converge at an angle, a border panel hinged to each of said edges, the adjacent ends of said panels being permanently connected along a hinge line defining a miter joint between said panels, said joint being inclined to the plane of said main display area when the device is set up whereby the panels form an inclined frame-like border, and a score line extending transversely across an end portion of each of said panels, said score lines being out of alignment and passing through the apex of said corner angle and being so arranged that the device may be collapsed by folding the material on one side of said score lines flat onto the material on the other side of them, thereby straightening the miter joint into a single plane parallel to the plane of said main display area.

3. In a collapsible cardboard display device, the combination with the elements set forth in claim 1, of a means for retaining the panel parts on opposite sides of said score line in a single plane when the device is set up.

4. In a collapsible cardboard display device, the combination with the elements set forth in claim 1, of a means for retaining the panel parts on opposite sides of said score line in a single plane when the device is set up, said means comprising a stiffening flap hinged to the outer edge of said panel, said score line being continued across said flap, the hinge between the panel and stiffening flap being straightened out when the device is collapsed and the parts of the stiffening flap on opposite sides of said score line being straightening into a single plane when the device is set up.

5. In a collapsible cardboard display device, a main display area including a corner where two adjacent edges converge at an angle, a border panel hinged to each of said edges, the adjacent ends of said panels being permanently connected to define an inclined frame-like border when the device is set up, a score line extending transversely across an end portion of one of said panels, said score line passing through the apex of said corner angle and being so arranged that the material on one side of it may be folded flat onto the material on the other side of it when the device is collapsed, a stiffening flap hinged to the outer edge of said panel, said score line being continued across said flap, a corresponding flap hinged to the outer edge of the other panel, said flaps being adapted to fold rearwardly when the device is set up, and means for releasably retaining said flaps in said rearwardly folded disposition.

6. In a collapsible cardboard display device, a main display area including a corner where two adjacent edges converge at an angle, a border panel hinged to each of said edges, the adjacent ends of said panels being permanently connected to define an inclined frame-like border when the device is set up, a score line extending transversely across an end portion of one of said panels, said score line passing through the apex of said corner angle and being so arranged that the material on one side of it may be folded flat onto the material on the other side of it when the device is collapsed, a stiffening flap hinged to the outer edge of said panel, said score line being continued across said flap, a corresponding flap hinged to the outer edge of the other panel, said flaps being adapted to fold rearwardly when the device is set up, and means for releasably interengaging the end portions of said flaps when the flaps are thus folded.

7. In a collapsible cardboard display device, a main display area including a corner where two adjacent edges converge at an angle, a border panel hinged to each of said edges, the adjacent ends of said panels being permanently connected to define an inclined frame-like border when the device is set up, a score line extending transversely across an end portion of one of said panels, said score line passing through the apex of said corner angle and being so arranged that the material on one side of it may be folded flat onto the material on the other side of it when the device is collapsed, a stiffening flap hinged to the outer edge of said panel, said score line being continued across said flap, a corresponding flap hinged to the outer edge of the other panel, said flaps being adapted to fold rearwardly when the device is set up, an attachment panel hinged to the outer edge of each of said flaps, and means for releasably interengaging the end portions of said attachment panels when the flaps and the attachment panels are folded rearwardly.

JOHN V. HORR.